No. 845,484. PATENTED FEB. 26, 1907.
R. SIMPSON.
FRUIT PICKING APPARATUS.
APPLICATION FILED MAR. 10, 1906.
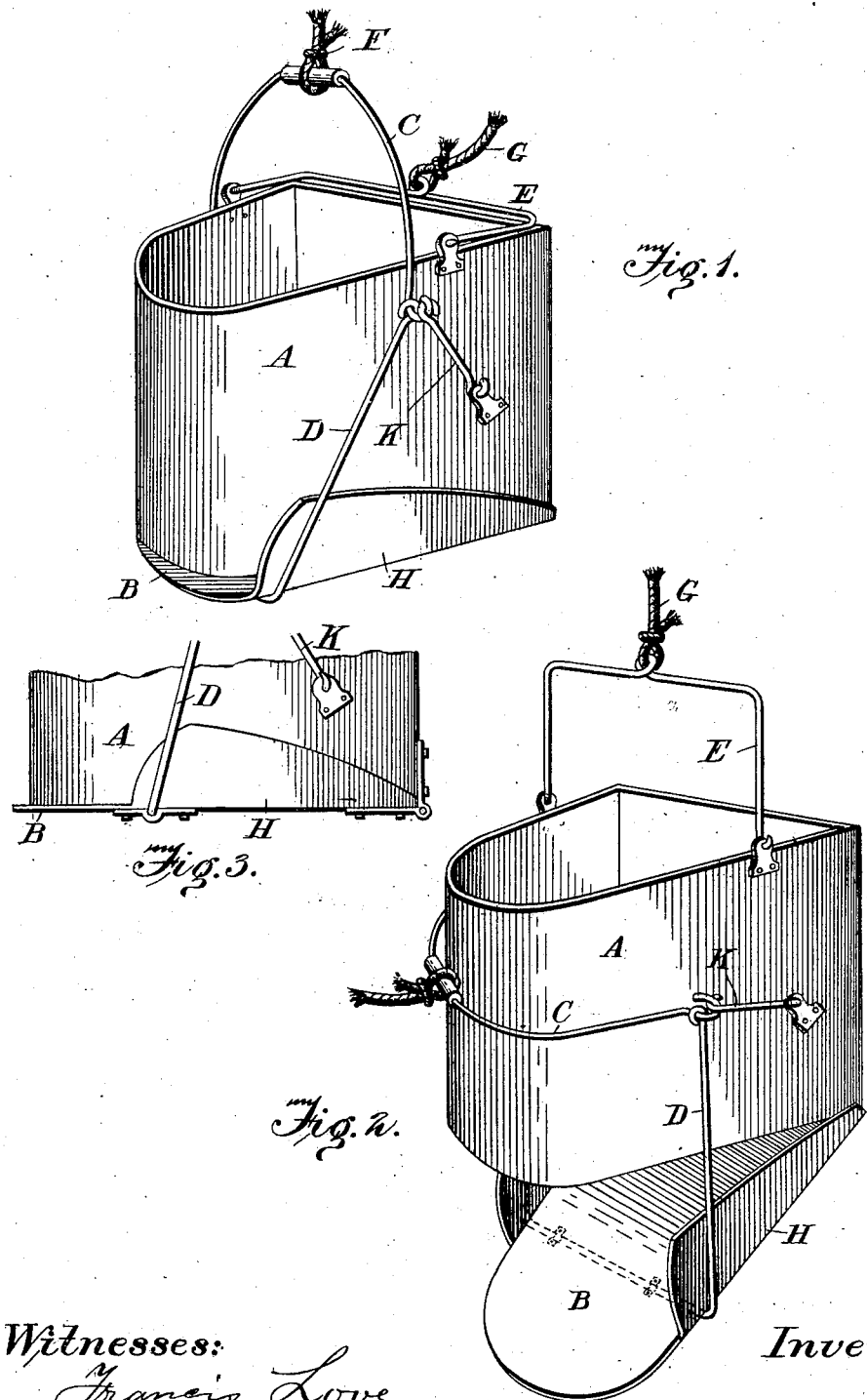
Witnesses:
Francis Love
W. J. J. Williams
Inventor:
Robt Simpson

UNITED STATES PATENT OFFICE.

ROBERT SIMPSON, OF LONDON, ONTARIO, CANADA.

FRUIT-PICKING APPARATUS.

No. 845,484.          Specification of Letters Patent.          Patented Feb. 26, 1907.

Application filed March 10, 1906. Serial No. 305,233.

*To all whom it may concern:*

Be it known that I, ROBERT SIMPSON, of the city of London, in the Province of Ontario, Canada, have invented certain new and useful Improvements in Fruit-Picking Apparatus, of which the following is a specification.

My object is to devise means whereby fruit may be gathered in the tree and placed in receptacles on the ground without being bruised or scratched; and my invention consists, essentially, of a receptacle having a hinged bottom and two bails, one adapted to support the receptacle alone and the other both the bottom and the receptacle, so that when the weight is supported from the latter bail the bottom remains closed and when the weight is supported from the former the bottom opens to discharge the contents of the receptacle, substantially as hereinafter more specifically described and then definitely claimed.

Figure 1 is a perspective view of my fruit-picking pail in its normal position. Fig. 2 is a similar view showing the pail in the dumping position. Fig. 3 is a side elevation of the bottom part of the pail.

In the drawings like letters of reference indicate corresponding parts in the different figures.

The apparatus comprises a receptacle A and a hinged bottom B. On the receptacle, on its lower part, is pivoted links K. Links D are pivotally connected with the bottom B. Links K and D are jointly connected to bail C at points which are above the pivots of the links K on the receptacle when the bottom is closed, as shown in Fig. 1. To the upper edge of the pail is pivoted or otherwise secured the bail E.

From the construction described it follows that as long as the weight of the receptacle and its contents is supported by the bail C the bottom will be held closed by the links D, the weight of the pail and its contents being partly supported by the links D and partly by the links K, which link K is directly connected to the receptacle. If, however, the support be transferred to the bail E, the weight on the bottom will cause it to assume the position shown in Fig. 2, the bail C also swinging, as shown. The contents of the receptacle are now free to slide quietly over the bottom and into any suitable receiver, such as a basket, pail, barrel, or stretcher. As the transference of support from the one bail to the other may be very gradual, the contents may be deposited as gently as may be desired.

The receptacle is hung at any point convenient to the fruit-picker. If he is near the ground, the apparatus may be operated directly by hand. If he is near the top of the tree, it is desirable to provide cords by which the apparatus may be lowered to the ground for dumping and again hoisted up into the tree. I show for this purpose cords F and G, attached, respectively, to bails C and E.

I show lips H at each side of the bottom. These are intended particularly to afford suitable guidance when dumping small fruit from the receptacle.

However, changes may be made in the form of some of the parts, while their essential features are retained and the spirit of the invention embodied. Hence I do not desire to be limited to the precise form of all the parts as shown, reserving the right to vary therefrom.

What I claim as my invention is—

1. A fruit-picking pail comprising a receptacle, with a bottom hinged thereon, and two bails; the first bail attached to the receptacle, the second bail connected by pivoted links to the bottom and by other pivoted links to the body of the receptacle, substantially as described.

2. A fruit-picking pail comprising a receptacle, with a bottom hinged thereon, a bail attached to the receptacle, a second bail, links pivoted to the receptacle and connected with the second bail, and pivoted links which connect the bottom to the second bail, substantially as described.

3. A fruit-picking pail or apparatus comprising a receptacle, with a lipped bottom hinged thereon, a bail pivoted on the receptacle, a second bail connected to the receptacle by means of links, and pivoted links connecting the bottom to the second bail, substantially as described.

In testimony that I claim the foregoing as my own I have hereto affixed my signature, in the presence of two witnesses, at London, Canada, March 6, 1906.

ROBERT SIMPSON.

In presence of—
    FRANCIS LOVE,
    W. T. WILLIAMS.